US012579212B1

(12) United States Patent
Nandihalli et al.

(10) Patent No.: US 12,579,212 B1
(45) Date of Patent: Mar. 17, 2026

(54) DYNAMIC CACHING STRATEGY FOR USER INTERFACE OBJECTS

(71) Applicant: Amazon Technologies, Inc., Seattle, WA (US)

(72) Inventors: Vikas Chandramouli Nandihalli, Newark, CA (US); Chirag Jain, San Jose, CA (US); Sai Kishore Pyapalli, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/539,464

(22) Filed: Dec. 1, 2021

(51) Int. Cl.
| | |
|---|---|
| *G06F 3/048* | (2013.01) |
| *G06F 3/0482* | (2013.01) |
| *G06F 9/451* | (2018.01) |
| *G06F 16/957* | (2019.01) |

(52) U.S. Cl.
CPC ........ *G06F 16/9574* (2019.01); *G06F 3/0482* (2013.01); *G06F 9/451* (2018.02)

(58) Field of Classification Search
CPC ..... G06F 16/9574; G06F 3/0482; G06F 9/451
See application file for complete search history.

(56) References Cited

U.S. PATENT DOCUMENTS

| | | | | |
|---|---|---|---|---|
| 2002/0107935 | A1* | 8/2002 | Lowery | H04L 67/289 709/216 |
| 2006/0143393 | A1* | 6/2006 | Petev | G06F 12/122 711/E12.071 |
| 2008/0307533 | A1* | 12/2008 | Hanai | H04N 21/6587 715/764 |
| 2012/0143996 | A1* | 6/2012 | Liebald | G06F 15/16 709/219 |
| 2012/0221514 | A1* | 8/2012 | Knight | G06F 16/211 707/610 |
| 2012/0284611 | A1* | 11/2012 | Burckart | H04L 67/2876 709/219 |
| 2013/0222264 | A1* | 8/2013 | Shirzadi | G06F 3/04883 345/173 |
| 2018/0241705 | A1* | 8/2018 | Sarafa | H04L 9/0827 |
| 2022/0179665 | A1* | 6/2022 | Rathod | G06F 9/451 |

* cited by examiner

*Primary Examiner* — Aleksey Olshannikov
(74) *Attorney, Agent, or Firm* — Kilpatrick Townsend & Stockton LLP

(57) ABSTRACT

Techniques for caching data objects are described. An expiry policy and a reference for one or more user interface (UI) objects is maintained. A user interface (UI) comprising the one or more UI objects is presented. A determination that a trigger of the expiry policy for a first UI object has been triggered is made based on first data from the UI or the computing device. The first UI object is determined to be expired based on the trigger. A request for a second UI object and second data is generated based on the reference for the second UI object and the expiry policy of the first UI object. The request is transmitted to an information source. The UI is updated to replace the first UI object with the second UI object in response to receiving the second UI object and the second data.

20 Claims, 10 Drawing Sheets

User Interface 100

104

106

| Category | Category | Category | Category |

108

112

Title 114

Play 116

● ○ ○ ○

120

110

102

| Content Tile 118A | Content Tile 118B | Content Tile 118C |
| Content Tile 118D | Content Tile 118E | Content Tile 118F |

Content Tile 118G

User Interface 100

Continued
on FIG. 2

2. Generate Pipeline for read and write operations. Write Flatbuffer bytes to Pipeline Screen Builder Application 504

1. Request Reference

3. Send pipe file descriptor and total size to renderer application

Renderer Application 502

4. Read Flatbuffer bytes from Pipeline, convert to java objects, and generate UI components

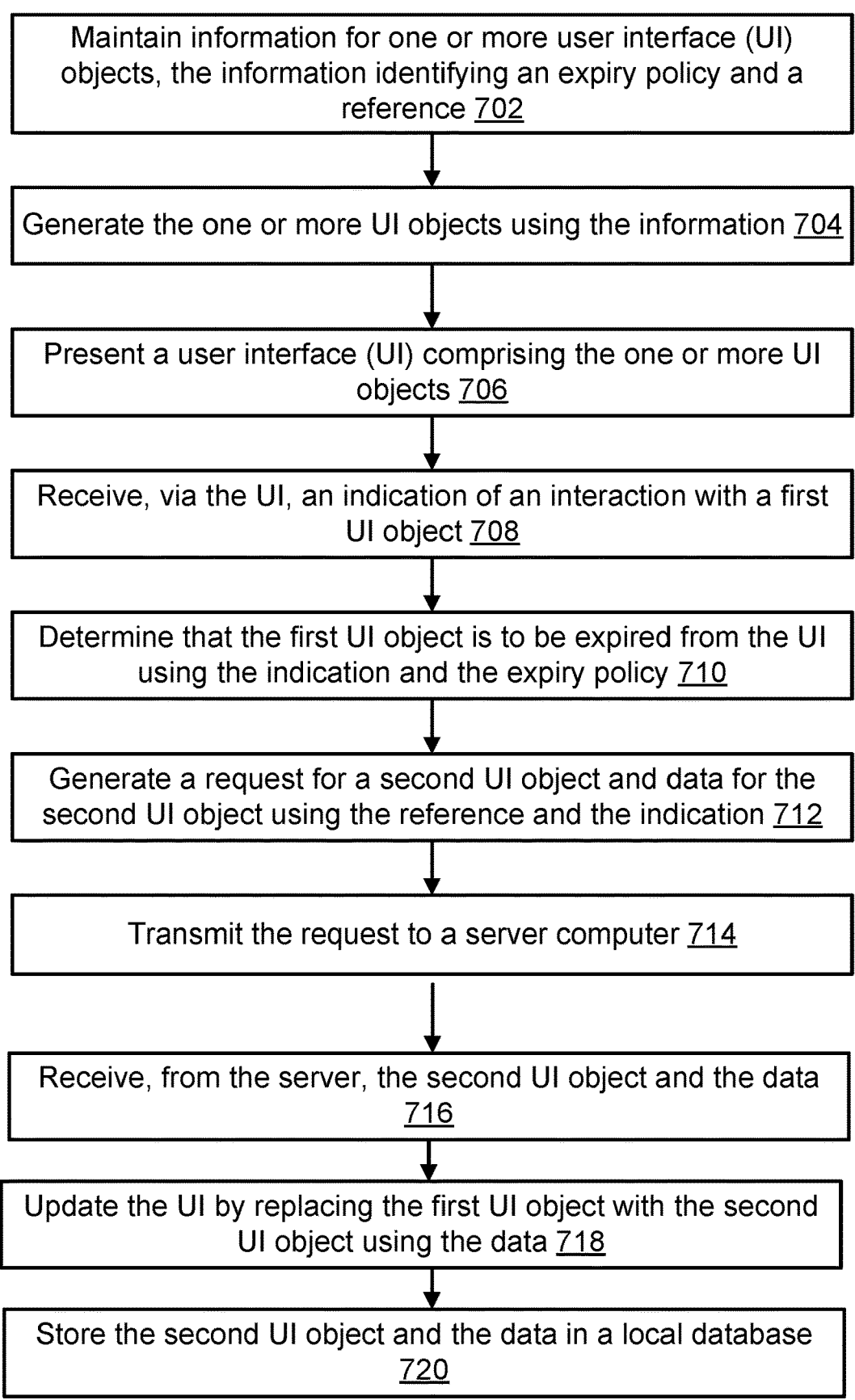

Maintain information for one or more user interface (UI) objects, the information identifying an expiry policy and a reference 702

Generate the one or more UI objects using the information 704

Present a user interface (UI) comprising the one or more UI objects 706

Receive, via the UI, an indication of an interaction with a first UI object 708

Determine that the first UI object is to be expired from the UI using the indication and the expiry policy 710

Generate a request for a second UI object and data for the second UI object using the reference and the indication 712

Transmit the request to a server computer 714

Receive, from the server, the second UI object and the data 716

Update the UI by replacing the first UI object with the second UI object using the data 718

Store the second UI object and the data in a local database 720

FIG. 7

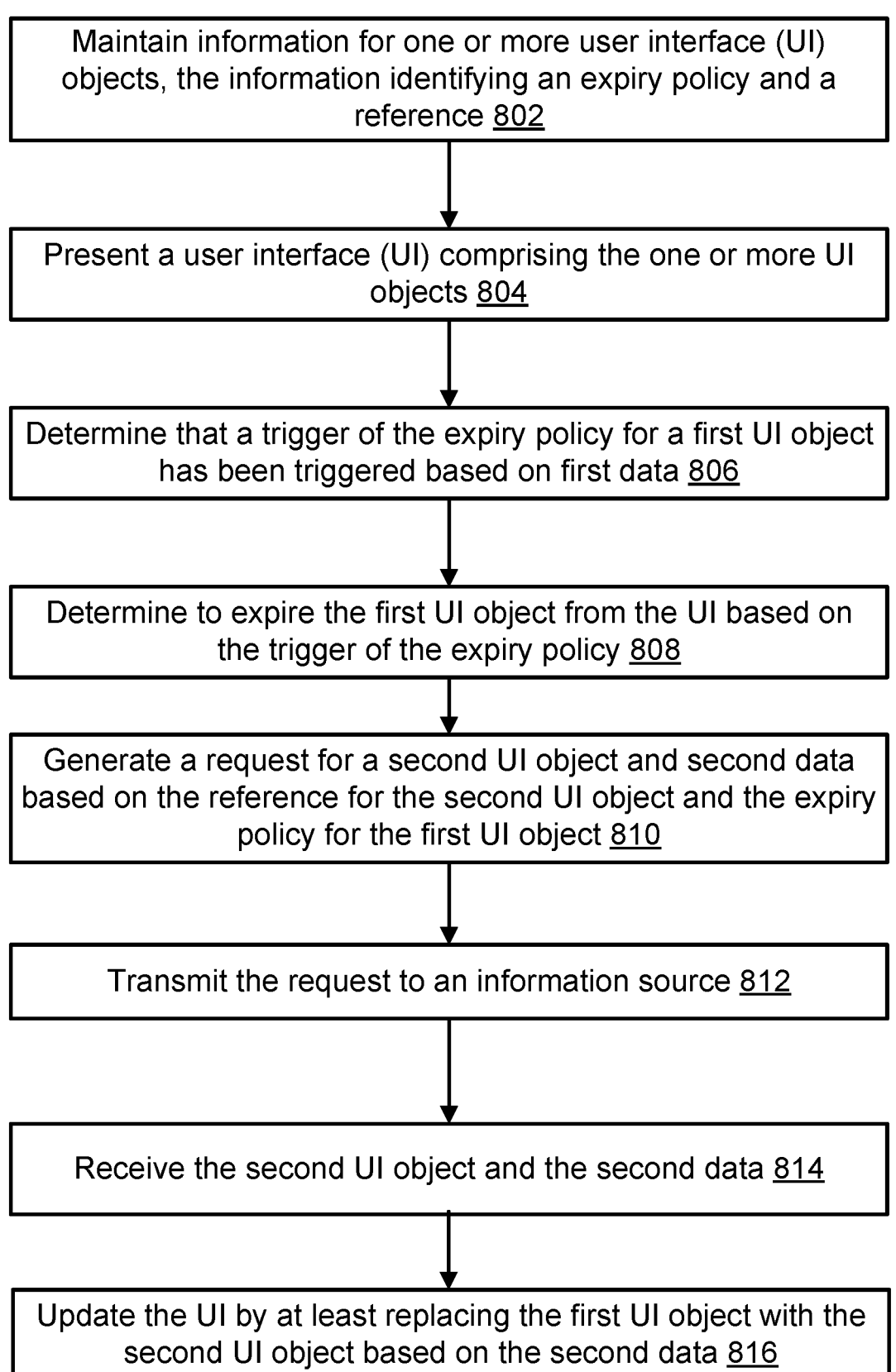

Maintain information for one or more user interface (UI) objects, the information identifying an expiry policy and a reference 802

Present a user interface (UI) comprising the one or more UI objects 804

Determine that a trigger of the expiry policy for a first UI object has been triggered based on first data 806

Determine to expire the first UI object from the UI based on the trigger of the expiry policy 808

Generate a request for a second UI object and second data based on the reference for the second UI object and the expiry policy for the first UI object 810

Transmit the request to an information source 812

Receive the second UI object and the second data 814

Update the UI by at least replacing the first UI object with the second UI object based on the second data 816

FIG. 8

DYNAMIC CACHING STRATEGY FOR USER INTERFACE OBJECTS

BACKGROUND

Different devices are available for presenting content to users. The content can be organized in a menu of user interface (UI) objects. The layout of the menu, the UI objects, and the content itself can be periodically updated resulting in different information being displayed. For some devices, a user selection can also result in the playing of particular content or turning off the device.

BRIEF DESCRIPTION OF THE DRAWINGS

Various embodiments in accordance with the present disclosure will be described with reference to the drawings, in which:

FIG. 7 illustrates an example of a flow diagram for providing an expiry policy feature with a computing device, according to at least one embodiment;

FIG. 8 illustrates an example of a flow diagram for providing an expiry policy feature with a computing device, according to at least one embodiment;

DETAILED DESCRIPTION

Figure 1:
FIG. 1 illustrates an example user interface (UI) with UI objects implementing an expiry policy feature, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, implementing policies which define how user interface (UI) objects are cached from an information source onto a computing device for use in updating UI objects and/or a user interface presenting the UI objects. The policies may comprise an expiry policy specified for a UI object including data for generating the UI object. An expiry policy may comprise a definition for a trigger which, upon being detected, indicates that the corresponding UI object is to be expired (no longer displayed via a current UI) and refreshed. A computing device comprising one or more applications can utilize the one or more applications to detect when a trigger of an expiry policy is triggered and request content from one of a number of information sources. As the trigger is detected, one application, a renderer application, may generate a request for content (a UI object and associated data for the UI object) from another application, a screen builder application. Each UI object when generated may be associated with information to render the UI object in a UI, an expiry policy, and a reference which uniquely identifies the UI object. The information for a UI object may also define other UI objects that are related to said UI object as each UI object may be a child of another UI object and a parent to another UI object (e.g., root UI objects as well as parent and child UI objects in a hierarchical structure).

In embodiments, the screen builder application can query an information source, starting with local information sources, for UI object(s) which will be used to replace the expired UI object. For example, the screen builder application can query a local memory cache populated by a local database using the reference of the UI object associated with the expiry policy. Should local information sources not be able to resolve the query the screen builder application can communicate via available networks with a server computer to retrieve a UI object for replacing the expired UI object. By utilizing an expiry policy which defines a trigger for expiring each UI object user interfaces can be dynamically updated to present different content based on user interactions with the UI without updating the entire current screen of a multi-screen interface. Databases which are local to a computing device may be cached with content (UI objects and corresponding data) from a server computer and the local database of the computing device can cache a local data cache with certain UI objects and corresponding data based on expiry policies or other policies associated with use of content or most recently used content.

To illustrate, consider example of a television (TV) with a content streaming device. The TV presents a user interface which includes multiple UI objects that correspond to movie and television titles. To populate the user interface, the content streaming device may query a local database for the multiple UI objects which correspond to the movie and television titles. A given movie title for an action movie may be associated with a pre-defined expiry policy which comprises an on focus trigger. The on focus trigger may correspond to a user interaction with the user interface that includes a navigation command of a visual indicator to the UI object for the action movie within the user interface. Upon detecting that the visual indicator is focused on the UI object for the action movie the content streaming device may query, using the reference for the UI object of the action movie, an information source for another UI object. For example, as the expiry policy is triggered by the visual indicator focusing on the UI object for the action movie, the content streaming device may determine that the UI object is to be replaced with another UI object in the user interface. To further illustrate, a still frame of a title of the action movie may correspond to a first UI object which is to be replaced with a second UI object that corresponds to a trailer for the action movie. The content streaming device can query the information source(s) for a cached UI object using the reference and update the user interface to replace the UI object of the action movie with a cached UI object. As a user interacts with the user interface various UI objects may be triggered depending on their varied expiry policies to present new content to the user without updating the entire UI as a user navigates and selects content for presentation.

Embodiments of the present disclosure provide several technical advantages over conventional caching and presentation techniques for UI objects of a user interface. For instance, conventional techniques include updating an entire screen or current screen of a user interface to update a particular UI object. Further, conventional computing devices incorporate a limited time based trigger for updating UI objects of a user interface. As such, user interfaces were limited to specific triggers for updating UI objects and when such triggers were activated more computer resources (bandwidth, memory, etc.) were utilized as the entire current UI screen needed to be updated to change a single UI object. The embodiments described herein allow for greater flexibility by content creators as they generate UI objects as they can define a specific expiry policy and trigger for a UI object which corresponds to their content as they see fit without concerning themselves with the over use of computer resources. Furthermore, users are able to be presented with more content as the individual UI objects are updated at a more frequent pace based on their corresponding expiry policies thereby improving their viewing experience. Usage of computer resources such as processor, memory, and network bandwidth are reduced as a computing device implementing the expiry policy feature may request smaller data packets which correspond to a UI object and associated data instead of an entire screen of UI objects when updating the user interface.

FIG. 1 illustrates an example user interface (UI) 100 with UI objects implementing an expiry policy feature, according to at least one embodiment. The UI 100 may be presented via a display of a computing device and include UI objects 102 and 104. The UI 100 includes a tab portion 106 and body portion 108 and 110, each of which includes UI objects 102 and 104. The tab portion 106 includes one or more category identifiers corresponding to different menus (or, similarly, menu pages) of the user interface 100. For example, the category identifiers of FIG. 1 can corresponds to categories of "Video Games" for a menu of video games which can be executed on the computing device, "Library" for a menu of movies or TV shows," and "Content Streaming" for a menu of currently streaming content. Each category identifier in the tab portion 106 corresponds to a UI object 104. In FIG. 1, UI object 104 is associated with a visual indicator which indicates which category identifier in the tab portion 106 is selected.

In an example, the body portion 108 includes a preview portion 112. The preview portion 112 provides a preview of featured content. A title 114 of the featured content is displayed along with an image (e.g., thumbnail) of the featured content. The preview portion 112 includes an additional UI object of a play button 116, which when selected, opens a content tile page for the featured content. The preview portion 112 may include multiple featured content to be cycled through, as indicated by the circles underneath the play button 116. The multiple featured content include UI objects and corresponding data for generating the featured content in user interface 100.

The body portion 110 includes additional content tiles 118A-G. Each of the content tiles 118A-G corresponds to a UI object. The content tiles 118A-G may correspond to movies, TV shows, advertisements, input options (e.g., HDMB, USB, disk, etc.), applications, and the like. In an example, the content tiles 118A-G are arranged in rows and columns making up a grid but other examples may include alternative arrangements of content tiles 118A-G. The user interface 100 includes a visual indicator 120. The visual indicator 120 is presented at a location of content tile 118A to indicate that a cursor is on the content tile 118A. In embodiments, the visual indicator 120 may be located at a location of content tile 118A in response to an interaction with the user interface 100 by a user. For example, a user may interact with user interface 100 to provide a navigation command which moves the visual indicator 120 to content tile 118A. Each UI object of user interface 100 which includes content tiles 118A-G and other user interface objects or graphical user interface objects presented via user interface 100 is associated with an expiry policy, a reference, a refresh policy, a UI-update policy, and relationship information.

The expiry policy for a given UI object, such as content tile 118A, defines a trigger for an event associated with the UI object. Upon the computing device detecting the triggering event the expiry policy indicates the action to be taken, such as by expiring the UI object and requesting another UI object to replace the expired UI object in a given user interface. In embodiments, the expiry policy may comprise a relative time caching trigger, an absolute time caching trigger, and event caching trigger, or an object synch trigger. An example of a relative time caching trigger includes a time period relative to a live time or current time on a computing device. For example, a 60000 ms relative time caching trigger would be triggered upon expiration of one minute from the current time on a computing device. An example of an absolute time caching trigger includes an epoch time period at which the associated UI object expires. For example, 12:00 pm EST absolute time caching trigger would be triggered at 12:00 pm EST.

An example of an event caching trigger includes various events such as whether the UI object is in focus (visual indicator is on the UI object), on display (the UI object is currently being displayed via a UI), or on disappear (the UI object is currently not being displayed on the UI after being displayed on the UI). Once the computing device associated with the UI detects an event associated with the event caching trigger has been triggered for a UI object the expiry policy would specify expiring of said UI object and refreshing of the UI object. An example of an object synch caching trigger includes a trigger which specifies that a current UI object should be expired upon detecting that one or more other specified UI objects have been expired. As such, this type of expiry policy can specify another UI object to use as the trigger for updating itself. An object synch cache can specify multiple other UI objects as triggers. An expiry policy may include a relationship synch caching trigger which include a trigger for expiring a given UI object based on the detected expiration of a related UI object based on a relationship between the UI objects (e.g., parent and child in a hierarchical structure). In embodiments, a reference comprises a unique alpha numeric string that is associated with each UI object. Expiration policies may refer to other UI objects, such as when defining relationships between UI objects, using references. In embodiments, the relationship information of a UI object includes information which identifies a relationship between UI objects in a hierarchical structure and may include references to one or more other UI objects. The relationship information may include data which identifies a UI object as a parent UI object or a child UI object.

In embodiments, a refresh policy defines rules for refreshing a UI object after it is expired in a local data cache. Examples of a refresh policy include a block policy and a use policy. A block policy specifies that an expired UI object will not be rendered on the UI and that the computing device will wait for a refresh of the expired UI object to complete and then render it. In cases where the UI object expires after being presented in a UI the UI may present a blank component until the refresh is complete (e.g., replacing the expired UI object with another UI object). A use policy specifies that an expired UI object will continue to be presented via the UI while the computing device renders the replacing UI object. In embodiments, a UI-update policy specifies when to update the UI after refreshing a UI object. Examples of a UI-update policy include an immediate update policy, a not focused update policy, or a next reload update policy. In an example, an immediate update policy specifies that the UI should immediately be updated to present the new refreshed UI object on the screen irrespective of the new refreshed UI object being partially visible, fully visible, invisible, or focused on in the UI.

In an example, a not focused update policy specifies that the UI should immediately be updated to present the new refreshed UI object on the screen unless a user has a focus on the old UI object (triggered object) in which case the update should be queued by the computing device until the user releases focus on the old UI object. For example, a user may provide a navigation command to move a visual indicator to another UI object other than the triggered UI object in the UI. In an example, a next reload update policy specifies that a UI should not be updated to present the refreshed UI object on screen immediately. Instead, the computing device will update the local data cache with the refreshed UI object and the old UI object will continue to be presented on the screen until the UI is reloaded or reconstructed from the local data cache. Upon such a reload or reconstruction the refreshed UI object will replace the expired UI object that was triggered by its associated expiry policy.

Referring back to FIG. 1, the content tile 118A may be associated with an expiry policy that specifies an on focus trigger. As the visual indicator 120 indicates that the user is focusing on content tile 118A the trigger for the UI object's expiry policy is triggered. The expiration policy for content tile 118A may specify that the content tile 118A is to be expired and refreshed with another UI object. Although FIGS. 1 and 2 describe updating a UI object with an expiration policy that includes an event trigger such as on focus it should be understood that the expiry policy features described herein include other triggers which are detected by the computing device for expiring a UI object and refreshing the UI object.

Figure 2:
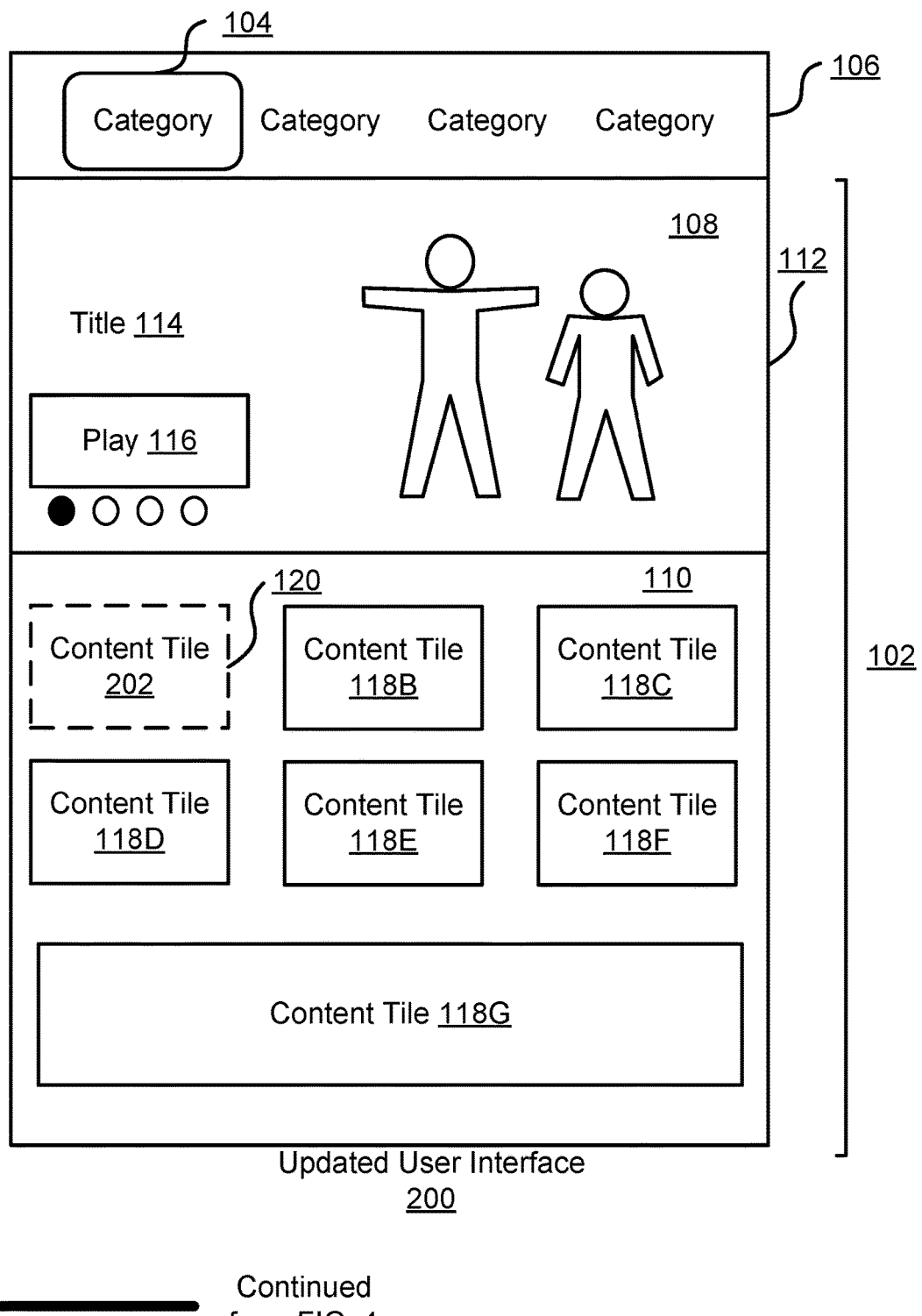
FIG. 2 illustrates an example updated UI with one UI object being updated and implementing an expiry policy feature, according to at least one embodiment.

FIG. 2 illustrates an example updated UI 200 with one UI object being updated (content tile 202) and implementing an expiry policy feature, according to at least one embodiment. The updated UI 200 may be presented via a display of a computing device and be an example of UI 100. The updated UI 200 may include UI objects 102 and 104. The updated UI 200 includes a tab portion 106 and body portion 108 and 110, each of which includes UI objects 102 and 104. The tab portion 106 includes one or more category identifiers corresponding to different menus (or, similarly, menu pages) of the updated user interface 200. For example, the category identifiers of FIG. 2 can corresponds to categories of "Video Games" for a menu of video games which can be executed on the computing device, "Library" for a menu of movies or TV shows," and "Content Streaming" for a menu of currently streaming content. Each category identifier in the tab portion 106 corresponds to a UI object 104. In FIG. 1, UI object 104 is associated with a visual indicator which indicates which category identifier in the tab portion 106 is selected.

In an example, the body portion 108 includes a preview portion 112. The preview portion 112 provides a preview of featured content. A title 114 of the featured content is displayed along with an image (e.g., thumbnail) of the featured content. The preview portion 112 includes an additional UI object of a play button 116, which when selected, opens a content tile page for the featured content. The preview portion 112 may include multiple featured content to be cycled through, as indicated by the circles underneath the play button 116. The multiple featured content include UI objects and corresponding data for generating the featured content in the updated user interface 200.

The body portion 110 includes additional content tiles 118B-G as well as newly refreshed UI object content tile 202. Continuing from FIG. 1, the updated user interface 200 may be updated to present content tile 202 in response to expiring content tile 118A. Content tile 118A may be expired based on its associated expiration policy specifying that an on focus event (e.g., visual indicator 120) being detected by the computing device via user interface 100 results in expiring content tile 118A. In embodiments, the expired content tile 118A may be stored in a local data cache of the computing device associated with user interface 100 and updated user interface 200. In some embodiments, the expired content tile 118A may be stored in a local database for later retrieval or it may be evicted from the computing device (e.g., no longer stored or saved in memory or storage of the computing device).

In accordance with at least one embodiment, the computing device associated with updated user interface 200 and user interface 100 retrieves content tile 202 from a local data cache using a reference or references of content tile 118A. For example, the data for the UI object which corresponds to content tile 118A may include a reference which can be used as a query by the computing device to identify another UI object to refresh the expired content tile 118A. In the example presented in FIG. 2, the reference for content tile 118A may be used as a query which results in a response of a reference for content tile 202 and its associated data. The computing device may be configured to query local information sources with the reference for content tile 118A such as a local data cache (local memory cache), a local database, or an applications source prior to communicating with a server via available networks. In embodiments, the computing device can query multiple information sources (e.g., local data cache, remote server, applications service (source for applications that are installed on the computing device which can be remote or local) simultaneously based on references identified for expiring UI objects. Upon receiving the data and UI object for content tile 202, the computing device may update the updated user interface 200 according to the data for the UI object which corresponds to content tile 202 (e.g., refresh policy and UI-update policy).

The computing device presenting updated user interface 200 may determine to cache the expired UI object (content tile 118A) based on a recently used policy. In an example, a recently used policy may specify that UI objects and their corresponding data is to be evicted from the computing device based on a usage basis for a given UI object and corresponding data. In embodiments, the computing device may be configured to periodically determine the usage of UI objects and corresponding data, such as when were certain UI objects and data used to populate a user interface, and evict (no longer store or maintain) the UI objects and data which are least used in comparison to other stored UI objects and data.

Figure 3:
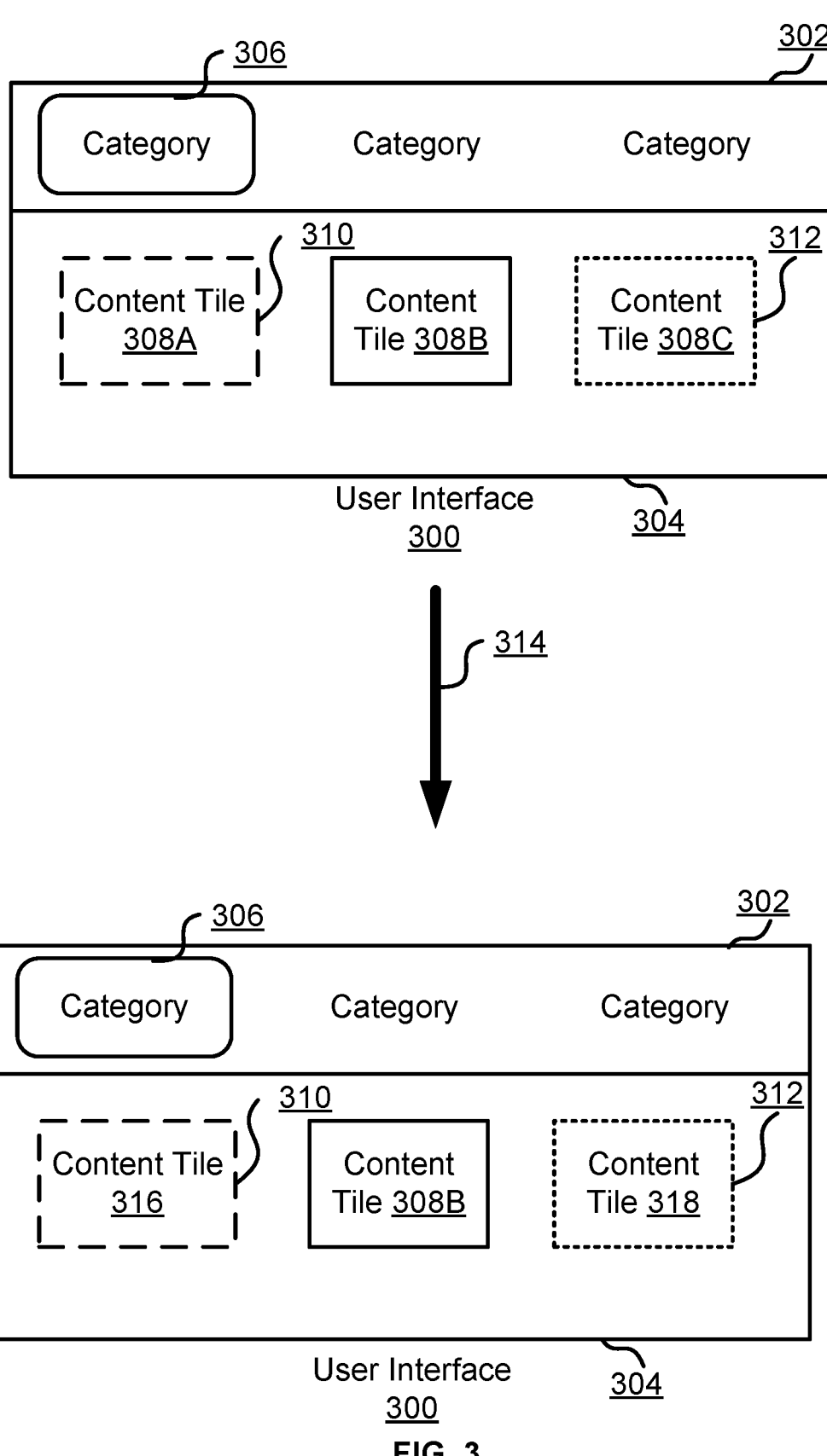
FIG. 3 illustrates an example UI with UI objects implementing an expiry policy feature, and updating multiple UI objects based on different expiry policies, according to at least one embodiment.

FIG. 3 illustrates an example UI 300 with UI objects implementing an expiry policy feature, and updating multiple UI objects based on different expiry policies, according to at least one embodiment. The user interface 300 of FIG. 3 includes a tab portion 302 and a body portion 304 similar to user interface 100 and updated user interface 200 of FIGS. 1 and 2. The user interface 300 includes a visual indicator 306 for a category in the tab portion 302 which may be associated with different categories of content presented via user interface 300. The body portion 304 includes one or more content tiles 308A-308C which may each be associated with a UI object. In an example, the content tiles 308A-308C may correspond to different content such as movies, television shows, or live sports events. To continue the example, content tile 308A may correspond to a still frame image of a movie whereas content tile 308C may correspond to a .GIF of a highlight play from a sports event.

In embodiments, each UI object (e.g., content tiles 308A-308C) may be associated with a different expiration policy, reference, and other information such as relationship information and refresh policies. FIG. 3 includes a visual indicator 310 for content tile 308A representing a first trigger of an expiration policy detected by the computing device presenting user interface 300. FIG. 3 also includes visual indicator 312 for content tile 308C representing a second trigger of a different expiration policy detected by the computing device presenting user interface 300. For example, the first trigger (represented by visual indicator 310) may correspond to an on display trigger event as defined by the associated expiry policy which is detected by the computing device upon the content tile 308A being presented via user interface 300. The second trigger (represented by visual indicator 312) may correspond to a relative time trigger as defined by the associated expiry policy and which is detected by the computing device upon an expiration of a certain time period from displaying the content tile 308C via user interface 300.

As described herein, the expiration policies of UI objects are triggered by a certain event which results in the computing device expiring UI objects whose policies are triggered and refreshing the expired UI objects with other retrieved UI objects. In FIG. 3, an update (as represented by arrow 314) to user interface 300 results in content tile 308A being replaced by content tile 316, and content tile 308C being replaced by content tile 318. The update 314 to user interface 300 displays the capability of computing devices implementing the expiry policy feature described herein to maintain, detect, and resolve a plurality of triggered expiry policies for a given user interface simultaneously. For example, as presented in FIG. 3, the expiry policy for content tile 308A, when triggered, may not trigger an expiry policy for content tile 308C (although in some cases it might). By defining an expiry policy with different triggering events content creators have greater control over how their content is displayed, interacted with, and refreshed in a user interface such as user interface 300. Further, as users interact with user interface 300 they are presented with a greater variety of content as triggering events are detected by the computing device presenting user interface 300 as defined by associated expiry policies. Computer resource usage is optimized as well as the computing device presenting the user interface 300 only makes requests for UI objects (e.g., content tile 316 and content tile 318) and their associated data to refresh content tile 308A and content tile 308C instead of requesting data for refreshing the entirety of user interface 300.

Figure 4:
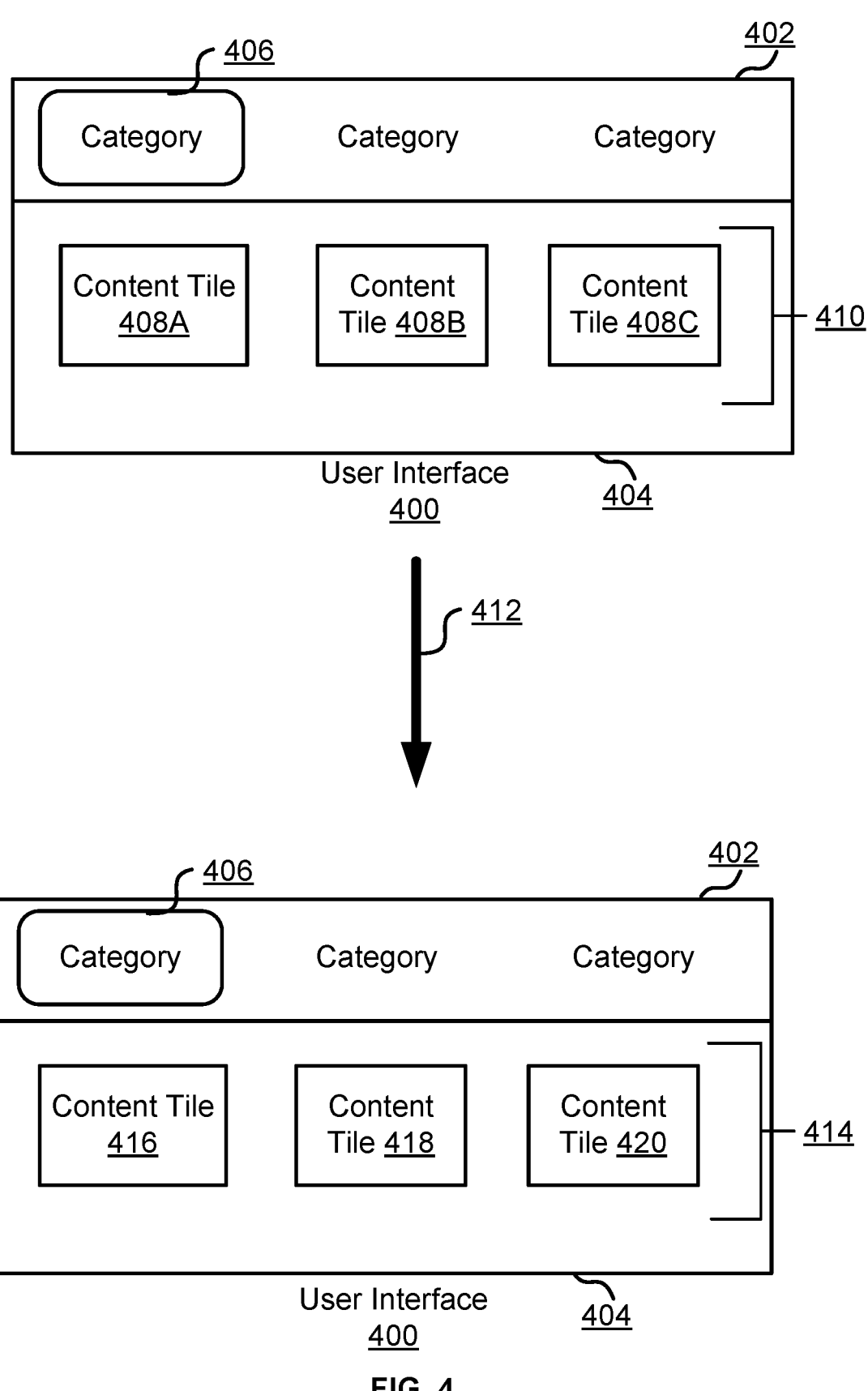
FIG. 4 illustrates an example UI with UI objects implementing an expiry policy feature where a carousel of UI objects of the user interface is updated based on an expiry policy, according to at least one embodiment.

FIG. 4 illustrates an example UI 400 with UI objects implementing an expiry policy feature where a carousel of UI objects of the user interface 400 is updated based on an expiry policy, according to at least one embodiment. The user interface 400 of FIG. 4 includes a tab portion 402 and a body portion 404 similar to user interface 100 and updated user interface 200 of FIGS. 1 and 2. The user interface 400 includes a visual indicator 406 for a category in the tab portion 402 which may be associated with different categories of content presented via user interface 400. The body portion 404 includes one or more content tiles 408A-408C which may each be associated with a UI object and corresponding data. In an example, the content tiles 408A-408C may correspond to different content such as anime, applications, or live content streaming. To continue the example, content tile 408A may correspond to a still frame image of an animated television show whereas content tile 408C may correspond to an advertisement for a video game content streamer.

User interface 400 depicts an indicator 410 which represents a carousel UI object that includes content tiles 408A-408C. In embodiments, UI objects which include other UI objects, such as a carousel UI object represented as 410 may be associated with an expiry policy, a reference, a refresh policy, relationship information, and a UI-update policy. For example, tab portion 402 and body portion 404 may include an expiry policy and other data for updating said portions upon detecting a trigger as defined by their expiry policies. As depicted in FIG. 4, the carousel UI object that includes content tiles 408A-408C includes a trigger which is detected by the computing device presenting user interface 400 which causes an update 412 to occur in user interface 400. For example, the expiry policy for the carousel which includes content tiles 408A-408C may be triggered upon the content tiles 408A-408C being displayed in user interface 400.

In response to detecting the trigger for the carousel which includes content tiles 408A-408C, the computing device may expire content tiles 408A-408C and request other content tiles (UI objects and associated data for rendering UI objects) to refresh the expired content tiles 408A-408C. As depicted in FIG. 4, the user interface 400 is updated 412 to present an updated carousel of objects 414 that includes content tile 416, 418, and 420. In embodiments, an expiry policy may include relationship information such that when a trigger for one UI object is triggered other UI objects are also determined to be expired according to the expiry policy and the relationship between the UI objects. As described herein, content creators can provide relationship information which links different UI objects by using their reference and defining an expiry policy to update all related UI objects upon the expiration of any of the related UI objects. FIG. 4 depicts the functionality of the expiry policy feature to update UI objects that include other UI objects as well as implement expiry policies which trigger the expiration of other UI objects as a result of certain events detected by the computing device.

Figure 5:
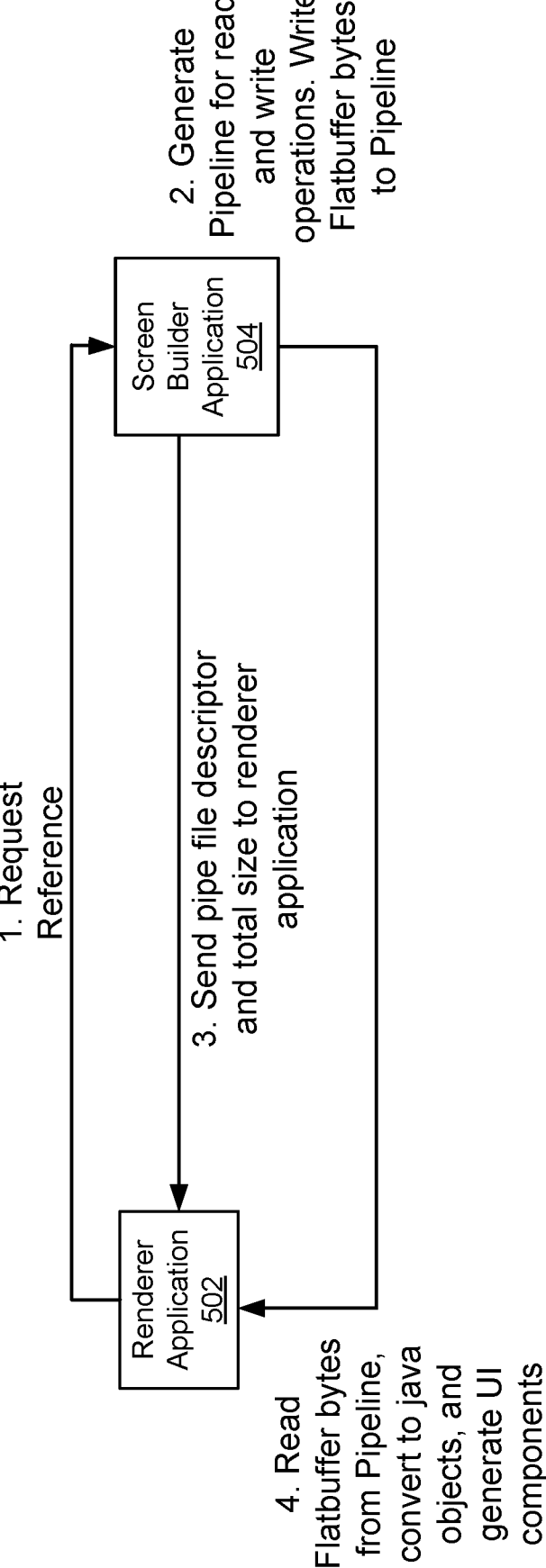
FIG. 5 illustrates an example of operations and communications between a renderer application and a screen builder application of a computing device for implementing an expiry policy feature, according to least one embodiment.

FIG. 5 illustrates an example of operations and communications between a renderer application and a screen builder application of a computing device for implementing an expiry policy feature, according to least one embodiment.

FIG. 5 includes renderer application (renderer) 502 in communication with screen builder application (screen builder) 504. In embodiments, a computing device implementing the expiry policy features described herein may implement one or more applications to execute certain operations of the expiry policy feature. For example, a renderer application 502 may be implemented for detecting events or triggers of UI objects presented via a user interface, identifying references of UI objects to be requested, generating a request for a UI object, and upon receipt of a UI object and associated data, generating the UI objects for updating a user interface. The computing device may also utilize a screen builder application for resolving requests for UI objects and associated data using received references, querying information sources (not pictured), generating a Pipeline for writing data for reading by the renderer application 502.

In an embodiment, the renderer application 502 is configured to create a reference for an expired UI object or obtain the reference from the data associated with an expired UI object. In an example, a computing device may maintain information which identifies the relationship between UI objects as well as a hierarchical structure that represents relationships between UI objects such as child to parent and parent to children node relationships in the hierarchical structure. As illustrated in FIG. 5, in a first step the renderer application 502 requests a reference from the screen builder application 504. As described herein, the renderer application may make the request for the reference in response to determining to expire a UI object of a UI based on the UI object's expiry policy.

In a second step of FIG. 5, the screen builder application generates a Pipeline for read and write operations. The screen builder application 504 may be configured to write Flatbuffer bytes to the Pipeline. In response to receiving the request for the reference from the first step, the screen builder application 504 may be configured to fetch or query an information source (not pictured) for the UI objects and corresponding data using the reference. For example, the screen builder application may fetch the UI objects and associated data for the UI objects from a local data cache, a local database, or a remote server that the computing device is in communication with via available networks. In an example, the screen builder application 504 is configured to concatenate all byte arrays of each object (UI object and associated data) into one single byte array. In embodiments, the byte array can be de-serialized using a flatbuffer scheme.

In a third step of FIG. 5, the screen builder application 504 sends a pipe file descriptor and total size of the retrieved objects to the renderer application 502. In embodiments, the renderer application 502 may utilize the pipe file descriptor to read objects from the generated Pipeline. In an embodiment, the screen builder application 504 writes the Flatbuffer bytes to the Pipeline after sending the pipe file descriptor to the renderer application. In a fourth step of FIG. 5, the renderer application 502 reads Flatbuffer bytes from the Pipeline, converts the objects of the Flatbuffer bytes to Java objects, and generates UI components (UI objects) for integration into a user interface. As described herein, the expiry policy of an expired UI object may result in refreshing of a first UI object (an expired UI object) with a second UI object (a refreshed UI object) based on the data retrieved and transmitted from the screen builder application 504. The renderer application 502 may be configured to process multiple requests for multiple UI objects whose expiry policies are triggered based on events of a user interface implemented by a computing device.

In embodiments, the computing device implementing the renderer application 502 and screen builder application 504 may generate a data object filter based on the data objects already stored or cached in a local data cache and/or a local database. The data object filter can be utilized by a server computer in communication with the computing device and/or screen builder application 504 for testing whether a data object (data) of a UI object is already cached or stored on the computing device. If the data objects associated with a request for a UI object are already cached or stored on the computing device then the response generated by the server computer to the request for UI objects and associated data can be modified. By modifying the response to the request for data savings can be achieved as duplicative information is not communicated between servers and the computing device or from the screen builder application 504 and the information sources. Data objects already stored or cached in the computing device will not be transmitted by the server computer and/or information sources to the screen builder application 504 or requested from a remote server based on querying the data object filter. In an embodiment, the data object filter can be populated based on period queries to the local data cache and/or local database. The data object filter may be updated based on insertions to the local database and/or local data cache as well as evictions from the local database and/or local data cache.

Figure 6:
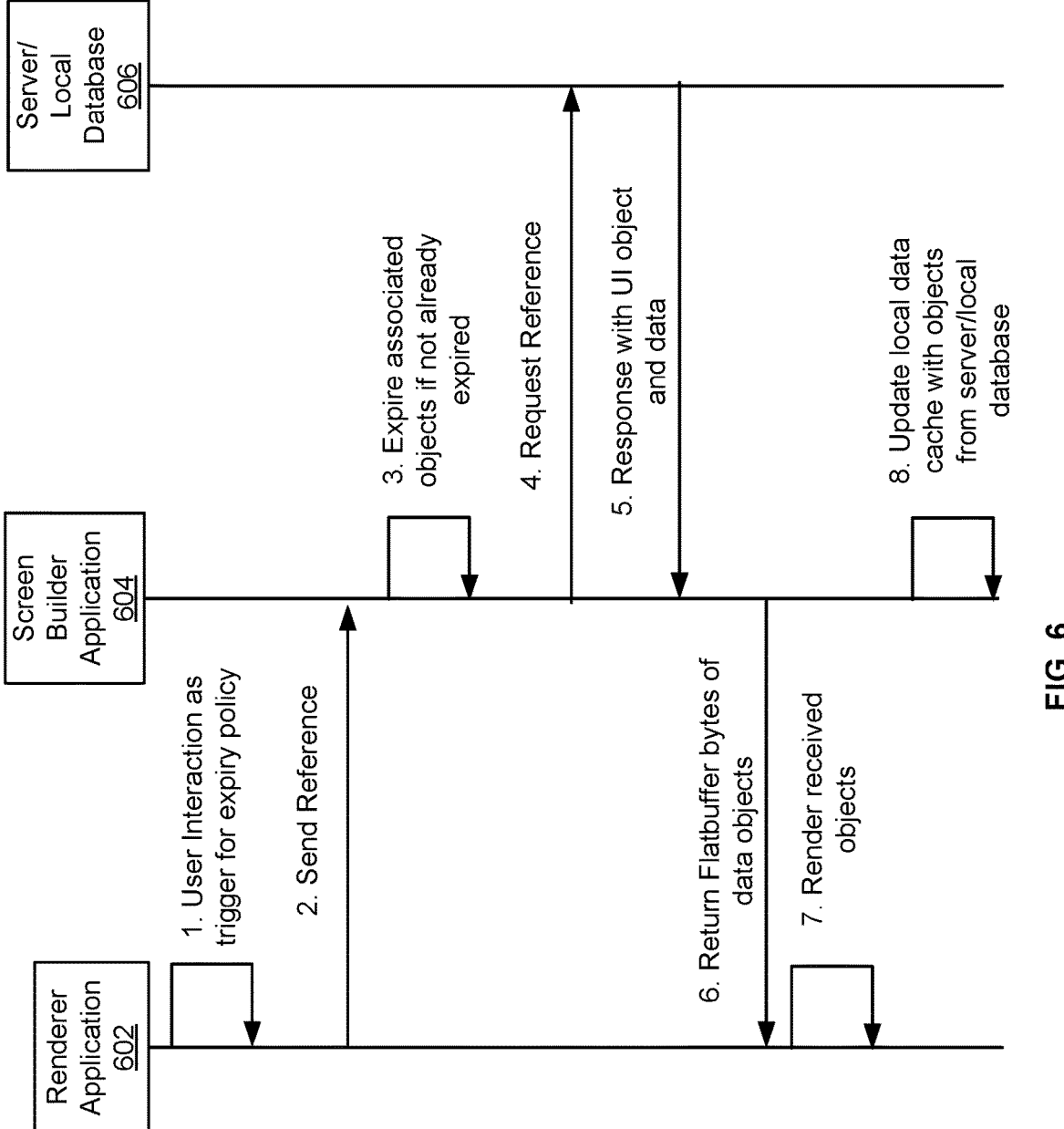
FIG. 6 illustrates an example of a sequence diagram between a renderer application, a screen builder application, and information source (server and/or local database) to implement an expiry policy feature for a computing device, according to at least one embodiment.

FIG. 6 illustrates an example of a sequence diagram 600 between a renderer application 602, a screen builder application 604, and information source (server and/or local database 606) to implement an expiry policy feature for a computing device, according to at least one embodiment. A computing device may be configured to implement the renderer application 602, the screen builder application 604, and the local database 606. The renderer application 602 and the screen builder application 604 may be examples of the renderer application 502 and the screen builder application 504 of FIG. 5. The computing device and the server 606 may be examples of computing device 900 and server 904 of FIG. 9. Generally, the computing device implementing the renderer application 602 and screen builder application 604 and the server 606 can exchange communications via available networks either during presentation of a user interface by the computing device or during a rest or off mode of the computing device.

As illustrated, in a first step of the sequence diagram 600, the renderer application 602 may detect a user interacting as a trigger for an expiry policy. For example, a user may provide a navigation command to move a visual indicator in the user interface to a first UI object presented via the user interface. In response to the user interaction trigger being detected by the renderer application 602, the renderer application 602 may determine that the first UI object is to be expired and refreshed with a second UI object according to the expiry policy for the first UI object which defines the interaction trigger.

As illustrated, in a second step of the sequence diagram 600, the renderer application 602 may send a reference for a second UI object to screen builder application 604. The reference may be associated with the first UI object or the data for the first UI object may reference one or more other references which include the second UI object. The renderer application may transmit the reference to the screen builder application 604 for querying the information sources (server/local database 606).

In a third step of the sequence diagram 600, the screen builder application 604 expires the first UI object or objects associated with the request if they are not already expired from the user interface. In embodiments, the first UI object and second UI object may be associated with refresh policies which specify when and how to expire UI objects from the user interface.

In a fourth step of the sequence diagram 600, the screen builder application 604 queries the information sources for UI objects and associated data (e.g., the second UI object and associated data for the second UI object) from information sources such as the server/local database 606. Although not illustrated the screen builder application 604 may query a local data cache (local memory cache) using the reference provided by the renderer application 602 for UI objects and associated data.

In a fifth step of the sequence diagram 600, the server/local database 606 may respond with a UI object and associated data in response to the request or query using the reference. In embodiments, the response may include multiple UI objects and associated data for the UI objects based on the expiry policy as well as the relationship between UI objects.

In a sixth step of the sequence diagram 600, the screen builder application 604 generates a Pipeline and writes Flatbuffer data objects to the Pipeline for reading by the renderer application 602. The screen builder application 604 then returns the Flatbuffer bytes of data objects obtained from the server/local database 606 via the Pipeline. In an example, the screen builder application 604 provides a file descriptor of the Pipeline to the renderer application 602 for accessing the Pipeline and reading the Flatbuffer bytes.

In a seventh step of the sequence diagram 600, the renderer application 602 renders the UI objects which correspond to the data objects from the screen builder application 604 in the user interface by at least replacing the first UI object with a second UI object. In embodiments, the renderer application 602 may convert the received Flatbuffer bytes into renderable objects of a UI for presentation in the UI.

In an eighth step of the sequence diagram 600, the screen builder application 604 updates a local data cache with data objects from the server/local database 606 received at the fifth step of sequence diagram 600. By updating the local data cache a data object filter may be updated to modify future requests for similar content. Additionally, by updating the local data cache future requests for the same content can be more efficiently processed between the renderer application 602 and screen builder application 604.

FIGS. 7 and 8 illustrate example flow diagrams for updating UI objects and a UI using an expiry policy feature on a computing device. The computing device can be any of the computing devices described herein. Some or all of the instructions for performing the operations of flows can be implemented as hardware circuitry and/or stored as computer-readable instructions on a non-transitory computer-readable medium of the computing device. As implemented, the instructions represent modules that include circuitry or code executable by a processor(s) of the computing device. The use of such instructions configures the computing device to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

FIG. 7 illustrates an example of a flow diagram for providing an expiry policy feature with a computing device, according to at least one embodiment. In an example, the flow starts at 702, where a computing device maintains information for one or more user interface (UI) objects. The information may identify, for each UI object, an expiry policy and a reference. An example of an expiry policy could be a relative time policy which triggers upon expiration of a certain time limit from the current time on the computing device (e.g., 60000 ms would correspond to expiring a UI object 1 minute from a current time on the computing device). As descried above, a reference may correspond to a unique alpha numeric string for identifying a UI object or data for the UI object. In embodiments, the information may include other data that can be used to render or generate a UI object for incorporation into a menu, a screen, or other user interface for presentation via the computing device.

At operation 704, the computing device generates the one or more UI objects using the information. In an embodiment, a renderer application of the computing device may utilize the information to generate a UI object or a screen or carousel which includes one or more UI objects. For example, one UI object may correspond to an image frame from a movie offered by a particular content provider while another UI object may correspond to a video game which can be interacted with to launch said game on the computing device.

At operation 706, the computing device presents a user interface (UI) comprising the one or more UI objects. In embodiments, the information further comprises data such as templates which define the width and height (in pixels) for each UI object, placement of the UI object in the overall UI or screen, and relationships between the UI objects. For example, some UI objects may serve as parent nodes to other UI objects or as children nodes to other UI objects.

At operation 708, the computing device receives or obtains, via the UI, an indication of an interaction with a first UI object. For example, the user interface may present a screen which includes three UI objects, each UI object corresponding to a preview frame of different anime shows. A user may utilize a navigation command to focus on a UI object which corresponds to one of the preview frames for a particular anime show. The resulting focus of the user on the UI object, as a result of the navigation command, may represent the indication of the interaction with a first UI object. In another example, the interaction with the first UI object may correspond to another navigation command or interaction command such as selecting the anime show for presentation (e.g., a select, watch, or consume command received via the user interface and provided by a user interacting with the user interface).

At operation 710, the computing device determines that the first UI object is to be expired from the UI using the indication and the expiry policy for the first UI object. For example, the expiry policy for the first UI object may define that a focus on the first UI object as detected by the user interface is a trigger for expiring the first UI object and refreshing the first UI object with a second UI object. In embodiments, the computing device may interpret the indication as a focus on the first UI object and compare the focus to the expiry policy maintained for the first UI object to determine to expire and refresh the first UI object from the UI. In embodiments, the renderer application of the computing device detects interactions or other events of the UI objects and UI and analyzes the interactions and events to determine whether a particular expiry policy has been triggered.

At operation 712, the computing device generates a request for a second UI object and data for the second UI object using the reference and the indication. For example, the renderer of the computing device may utilize the reference for the first UI object and/or the reference for the second UI object and the indication to generate the request. In embodiments, the screen builder may receive the request and search for other references associated with the reference for the first UI object and/or second UI object. For example, the first UI object may be associated with several other UI objects (children objects) as the first UI object is a parent object. In embodiments, updating a parent node or a child node results in updating all downstream nodes (UI objects).

At operation 714, the computing device transmits the request to a server computer. In embodiments, the screen builder of the computing device may transmit the request to the server via available networks. In accordance with at least one embodiment, the request may be transmitted to an information source. The information source may correspond to an applications source, a local database, or a local data cache of the computing device. In embodiments, the computing device may utilize a priority to transmit the request for the second UI object to the local data cache first, the local database second, the applications source third, and the server fourth.

At operation 716, the computing device receives, from the server, the second UI object and the data for the second UI object. In embodiments, the second UI object and the data may be transmitted as Flatbuffer bytes to the screen builder of the computing device. The screen builder may generate a pipeline for writing the Flatbuffer bytes to. The renderer of the computing device may receive a pipe file descriptor for accessing the pipeline and reading the Flatbuffer bytes from the pipeline. The renderer application converts the Flatbuffer bytes to Java objects and generates the second UI object using the Java objects.

At operation 718, the computing device updates the UI by replacing the first UI object with the second UI object using the data. For example, the on focus trigger for a preview of an anime show (first UI object) discussed above may be updated to present a trailer (second UI object) for the same anime show in the UI as a result of the update to the UI by the renderer application and computing device.

At operation 720, the computing device stores the second UI object and the data for the second UI object in a local database. For example, the computing device may be in communication with and maintain a local database, such as an SQLite database, for storing UI objects and associated data. As described herein, the local database may update a local data cache for more efficient querying by the computing device upon detecting the triggering of expiry policies for UI objects maintained by the computing device. In embodiments, the local database and local data cache may be pre-cached with certain UI objects and corresponding data based on triggering of associated expiry policies as detected by the renderer and computing device. The pre-caching of these information sources can result in a more optimized update to UI objects and user interfaces compared to conventional techniques which included updating the entire user interface instead of just a single tile or UI object within the user interface.

FIG. 8 illustrates an example of a flow diagram for providing an expiry policy feature with a computing device, according to at least one embodiment. In an example, the flow starts at 802, where a computing device maintains information for one or more user interface (UI) objects. The information may identifies, for an individual UI object of the one or more UI objects, an expiry policy and a reference. An example of an expiry policy could be whether the UI object is displayed on a screen of a user interface. Another example of an expiry policy could be whether the UI object is selected in the user interface by a user interacting with the user interface such as by providing a navigation command or interaction command. In embodiments, the information may include other data that can be used to render or generate a UI object for incorporation into a menu, a screen, or other user interface for presentation via the computing device.

At operation 804, the computing device presents a user interface (UI) comprising the one or more UI objects. In an embodiment, a renderer application of the computing device may utilize the information to generate a UI object or a screen or carousel which includes one or more UI objects. In embodiments, the UI may be presented via a display of the computing device via a browser or native application of the computing device.

At operation 806, the computing device determines that a trigger of the expiry policy for a first UI object has been triggered based on first data. In an example, the first data comprises information obtained by the computing device and/or renderer application of the computing device that corresponds to events with the UI. For example, the first data may include events which identify particular UI objects currently being displayed on the UI, UI objects which have been focused on by a user interacting with the UI, or objects which have been selected by the user interacting with the UI. In embodiments, the computing device and renderer application may detect multiple events occurring with one or more UI objects simultaneously.

At operation 808, the computing device determines to expire the first UI object from the UI based on the trigger of the expiry policy. For example, the expiry policy for the first UI object may define that expiration of a certain time associated with displaying the first UI object is a trigger for expiring the first UI object and refreshing the first UI object with a second UI object. In embodiments, the computing device may maintain and track the amount of time that the first UI object has been displayed on a current screen of the UI and compare the amount of time to the expiry policy maintained for the first UI object to determine to expire and refresh the first UI object from the UI. In embodiments, the renderer application of the computing device detects interactions or other events of the UI objects and UI and analyzes the interactions and events to determine whether a particular expiry policy has been triggered.

At operation 810, the computing device generates a request for a second UI object and second data based on the reference for the second UI object and the expiry policy for the first UI object. For example, the renderer of the computing device may utilize the reference for the first UI object and/or the reference for the second UI object and the indication to generate the request. In embodiments, the screen builder may receive the request and search for other references associated with the reference for the first UI object and/or second UI object. For example, the first UI object may be associated with several other UI objects (children objects) as the first UI object is a parent object. In embodiments, updating a parent node or a child node results in updating all downstream nodes (UI objects).

At operation 812, the computing device transmits the request to an information source. In an example, the request may be transmitted by the screen builder to an information source. The information source may correspond to a local data cache associated with a locally maintained database, the locally maintained database, an applications source (source of information for other applications of the computing device), or a server computer. In embodiments, the second UI object and data for the second UI object may be cached already in the local data cache resulting in an efficient request and response mechanism for updating the first UI object to the second UI object.

At operation 814, the computing device receives the second UI object and the second data. In an example, the screen builder application receives the second UI object and the second data or otherwise obtains the second UI object and the second data from local sources (e.g., local database, local data cache, or applications source). In embodiments, the second UI object and the second data may be transmitted as Flatbuffer bytes to the screen builder of the computing device. The screen builder may generate a pipeline for writing the Flatbuffer bytes to. The renderer of the computing device may receive a pipe file descriptor for accessing the pipeline and reading the Flatbuffer bytes from the pipeline. The renderer application converts the Flatbuffer bytes to Java objects and generates the second UI object using the Java objects.

At operation 816, the computing device updates the UI by at least replacing the first UI object with the second UI object based on the second data. For example, the first UI object may correspond to a tile presenting the title of a movie and the second UI object may correspond to a detail page for the movie which provides information such as a description for the movie and reviews for the movie.

Figure 9:
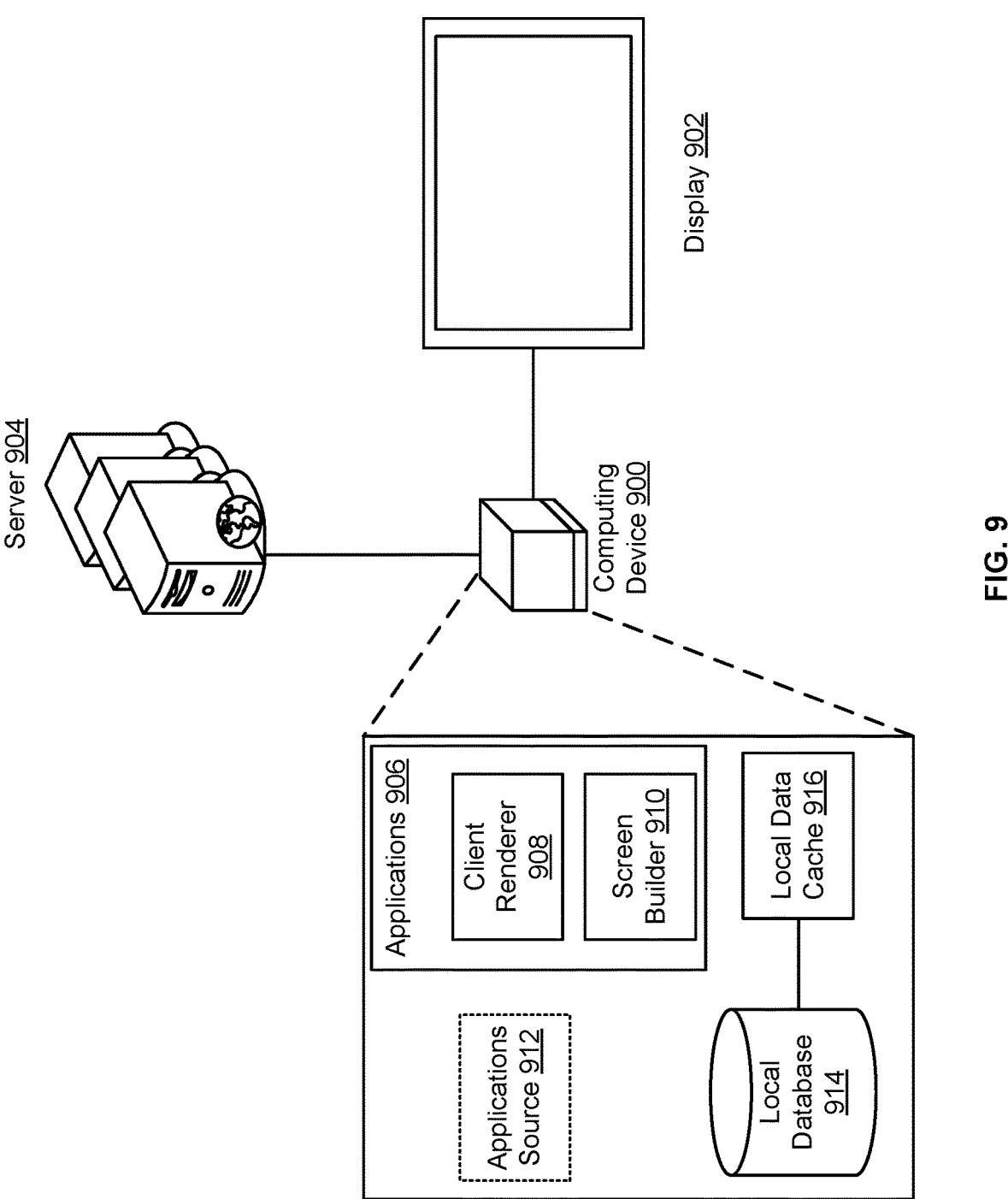
FIG. 9 illustrates an example of a system that includes a computing device, a display, and a server set to support an expiry policy feature for caching and updating UI objects with the computing device and updating UI on the display, according to at least one embodiment.

FIG. 9 illustrates an example of a system that includes a computing device 900, a display 902, and a server 904 to support an expiry policy feature for caching and updating UI objects with the computing device 900 and updating UI on the display 902, according to at least one embodiment. The computing device 900 can be communicatively coupled with the server 904. In this case, the computing device 900 and the server 904 are also examples of the computing device implementing renderer application 6XX and screen builder application 6XX, and the server 6XX, respectively, of FIG. 6. In particular, the computing device 900 can include applications 906 which implements client renderer 908 and screen builder 910 for determining whether an expiry policy for an object has been triggered, requesting a new object, retrieving the new object, and updating a user interface for display 902. The computing device 900 can include an applications source 912 for obtaining data for updating UI objects associated with applications of the computing device such as third party applications of the computing device 900. For example, a UI generated by computing device 900 may include one or more UI objects that are associated with one or more applications of the computing device 900 such as content provider applications or content streaming applications. In FIG. 9, the applications source 912 is illustrated with a dotted line to indicate that the computing device 900 may request data for other applications of the computing device 900 from other sources such as server 904 or directly from third part computers (not pictured) via available networks. The computing device 900 may include a local database 914 and local data cache 916. The local database 914 and local data cache 916 may be used to cache UI objects and data for implementing the UI objects obtained from server 904. In embodiments, expired UI objects may also be stored in the local database 914. In accordance with at least one embodiment, the screen builder 910 may request, using a reference, a UI object and data for the UI object from the local data cache 916, the local database 914, and/or the server 904. Further, the server 9014 can be a cloud computing platform.

In addition, the server 904 can include applications 906, client renderer 908, and screen builder 910. The applications 906, client renderer 908, and screen builder 910 provide similar functionalities, such as detecting and/or receiving a trigger associated with an expiry policy for a UI object, requesting a new object, retrieving the new object, and updating a user interface for display 902. In this example, the trigger may be detected by the computing device 900 and transmitted to the server 904 for further analysis and action (e.g., expiring of a UI object, refreshing the UI object, and updating the UI object and/or user interface for display 902). In such an example, the server 904 may retrieve the requested object and data and transmit the requested object and data to the computing device 900 for updating a particular UI object and/or the screen for display 902. In embodiments, the UI objects and user interface may be generated by the server 904 and provided to the computing device 900 for display 902.

In an example, server 904 may obtain and maintain user profile information for users associated with an online marketplace and/or one or more content stream services. The user profile information may be collected from multiple computing devices about user interactions with the online marketplace and/or one or more content streamer services. The user interactions may correspond to navigation commands, action commands, and other types of commands requested by users to interact with content (UI objects) presented on displays via their respective computing devices. The user interactions can also correspond to interactions with selectable actions available from one or more user interfaces presented on display 902. A recommendation engine or model may be trained using the user profile information to generate recommended content, associated UI objects, and corresponding data for the UI objects. The recommended content, UI objects, and data may be pre-cached to particular computing devices (computing device 900) based on the generated recommendations by the server and recommendation engine or model. In embodiments, the recommendation engine or model may use aggregated user profile information from multiple users interacting with respective user interfaces and presented content to generate a recommendation for pre-caching certain content, UI objects, and data to computing devices. The recommendation engine or model can be implemented as a deep learning neural network that learns patterns and outputs a prediction of certain content to recommend for pre-caching a computing device 900 with based on the user profile information. For example, a given pattern may indicate that after a user has searched for certain terms associated content provided by a content provider that several trailers for certain content should be pre-cached on the computing device 900.

In another example, the computing device 900 and server 904 can pre-cache (e.g., store UI objects and data for the UI objects) in the local database 914 and local data cache 916 prior to a user turning on the computing device 900 or while the computing device 900 is in a rest state or inactive state. The computing device 900 and server 904 can pre-cache the UI objects and data for the UI objects in the background or simultaneously while a user interacts with computing device 900 or display 902. For example, content may be retrieved and cached in local database 914 and local data cache 916 while a user navigates a menu on a user interface presented on display 902 or consumes content presented on display 902. In embodiments, UI objects and data transmitted or otherwise obtained by the local database 914 may be stored in the local data cache 916 for more efficient access by the screen builder 910. Operations to detect a trigger of an expiry policy, request content using a reference, retrieving the content, and providing the content for updating a UI and/or UI object using the client renderer 908 and screen builder 910 are discussed above in more detail with reference to FIG. 5. In embodiments, the computing device 900 may implement a filter which is populated with data for UI objects maintained in the local database 914 and/or local data cache 916.

The filter may be queried or utilized prior to requesting UI objects and associated data for the UI objects from server 904 by the computing device 900 and screen builder 910. For example, based on an interaction with a user interface presented on display 902 the computing device 900 may determine that an expiry policy has been triggered and a certain UI object of the user interface should be expired and refreshed. Previous expiry policies may have resulted in certain data being previously provided and stored in local database 914 for similar content. In such cases, the filter may be queried for the presence of certain data to modify the request for data from the server 904. For example, certain data such as a movie title and description may not need to be communicated from server 904 to computing device 900 if the movie title and description is already present in local database 914. In such cases, the filter may be queried and results from the query may be used to modify the request to server 904 for obtaining data and UI objects for refreshing a UI object and/or user interface thereby creating more efficient use of bandwidth and resources between the computing device 900 and server 904. In embodiments, the computing device 900 may evict, delete or no longer store, UI objects and data for the UI objects from the local database 914 and local data cache 916 based at least in part on a least recently used policy which identifies UI objects, data, and screens for eviction based on a usage basis.

Figure 10:
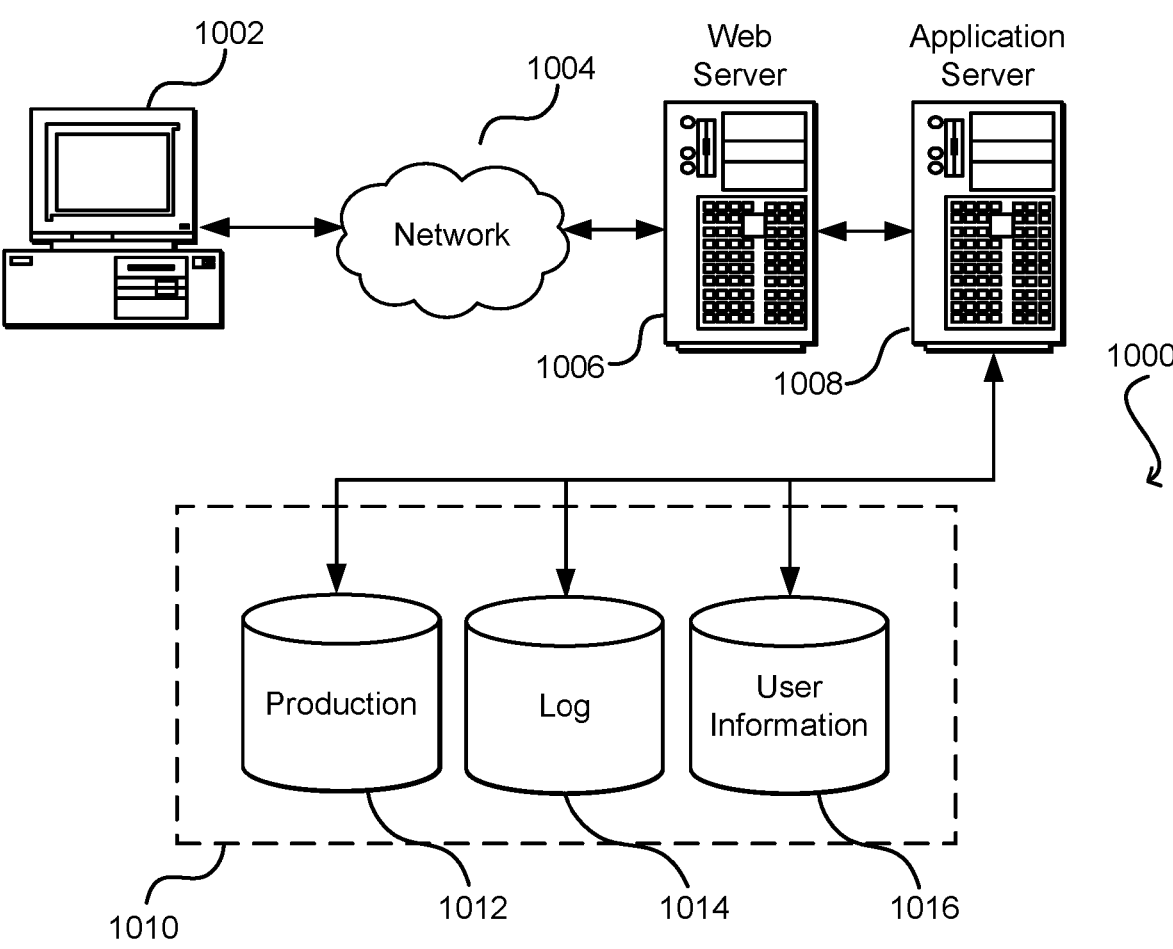
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, by a computing device, information for one or more user interface (UI) objects, the information identifying, for each UI object of the one or more UI objects, an expiry policy, a UI-update policy, and a reference, the expiry policy associated with temporary storage upon a UI object replacement;
   generating, by the computing device, the one or more UI objects using the information;
   presenting, by the computing device, a user interface (UI) comprising the one or more UI objects;
   receiving, by the computing device and via the UI, an indication of an interaction with a first UI object of the one or more UI objects, the interaction corresponding to a trigger for a first expiry policy of the first UI object;

determining, by the computing device, that the first UI object is to be expired from the UI using the indication and the first expiry policy for the first UI object;
generating, by the computing device, a request for a second UI object of the one or more UI objects and second data for the second UI object using the reference for the second UI object and the indication;
transmitting, by the computing device, the request to a server computer;
receiving, by the computing device and from the server computer, the second UI object and the second data;
queuing, by the computing device, an update to the UI, the update queued based at least in part on the UI-update policy of the first UI object and on a focus established by a visual indicator moved on the first UI object by a navigation command;
applying, by the computing device, the update to the UI by replacing the first UI object with the second UI object using the second data, the update applied immediately in response to removal of the visual indicator from the first UI object, the removal corresponding to a navigation command that moves the visual indicator away from the first UI object;
determining, by the computing device and in response to replacing the first UI object with the second UI object at the UI, to maintain the first UI object, after being replaced, in a local data cache based at least in part on the first expiry policy for the first UI object;
storing, by the computing device, the second UI object and the second data in a local database; and
updating, by the computing device, the UI by replacing the second UI object with the first UI object retrieved from the local data cache using first data in response to a second indication of a second interaction with the second UI object, the second interaction corresponding to a second trigger for a second expiry policy of the second UI object.

2. The computer-implemented method of claim 1, wherein applying the update to the UI further comprises using relationship information of the first UI object, wherein the information further comprises the relationship information to other UI objects of the one or more UI objects.

3. The computer-implemented method of claim 1, further comprising: receiving, by the computing device and from the server computer, a query generated by the server computer to modify a response to the request for the second UI object, wherein the request includes a data object filter and the response is modified to remove a portion of the second data from the response in response to at least the portion of the second data being identified by the data object filter as being stored in the local data cache.

4. The computer-implemented method of claim 3, wherein receiving, by the computing device and from the server computer, the query to modify the response comprises receiving the query for the data object filter, wherein the data object filter may be updated based at least in part on updates to the local data cache.

5. A computer-implemented method, comprising:
   maintaining, by a computing device, information for one or more user interface (UI) objects, the information identifying, for an individual UI object of the one or more UI objects, an expiry policy, a UI-update policy, and a reference, the expiry policy associated with temporary storage upon a UI object replacement;
   presenting, by the computing device, a user interface (UI) that comprises the one or more UI objects;

determining, by the computing device, that a trigger of a first expiry policy for a first UI object of the one or more UI objects has been triggered based at least in part on first data from the UI or a computer system;

determining, by the computing device, to expire the first UI object from the UI based at least in part on the trigger of the first expiry policy for the first UI object;

generating, by the computing device, a request for a second UI object of the one or more UI objects and second data for the second UI object based at least in part on the reference for the second UI object and the first expiry policy for the first UI object;

transmitting, by the computing device, the request to an information source;

receiving, by the computing device and from the information source, the second UI object and the second data;

queuing, by the computing device, an update to the UI, the update queued based at least in part on the UI-update policy of the first UI object and on a focus established by a visual indicator moved on the first UI object by a navigation command;

applying, by the computing device, the update to the UI by at least replacing the first UI object with the second UI object based at least in part on using the second data, the update applied immediately in response to removal of the visual indicator from the first UI object, the removal corresponding to a navigation command that moves the visual indicator away from the first UI object;

determining, by the computing device and in response to replacing the first UI object with the second UI object at the UI, to maintain the first UI object, after being replaced, in a local data cache based at least in part on the first expiry policy for the first UI object; and updating, by the computing device, the UI by replacing the second UI object with the first UI object retrieved from the local data cache using first data in response to a second indication of a second interaction with the second UI object, the second interaction corresponding to a second trigger for a second expiry policy of the second UI object.

6. The computer-implemented method of claim 5, further comprising storing, by the computing device, the second UI object and the second data in the local data cache associated with a local database; and determining, by the computing device, to evict the first UI object maintained in the local data cache in response to usage of the first UI object falling below usage of other UI objects of the one or more UI objects.

7. The computer-implemented method of claim 5, further comprising: receiving, by the computing device and from the information source, a query generated by the information source to modify a response to the request for the second UI object, wherein the request includes a data object filter and the response is modified to remove a portion of the second data from the response in response to at least the portion of the second data being identified by the data object filter as being stored in the local data cache.

8. The computer-implemented method of claim 6, wherein determining, by the computing device, to evict the first UI object from the local data cache is based at least in part on a recently used policy identifying the first UI object for eviction based at least in part on the usage of the first UI object and corresponding data.

9. The computer-implemented method of claim 5, wherein the trigger of the first expiry policy comprises at least one of a relative time caching trigger, an absolute time caching trigger, an event caching trigger, an object synch caching trigger, or a relationship synch caching trigger.

10. The computer-implemented method of claim 5, wherein the information further comprises a refresh policy, the refresh policy comprising at least a block policy for the first UI object or a use policy for the first UI object, wherein the UI-update policy comprises at least an immediate update policy for the first UI object, a not focused update policy for the first UI object, or a next reload update policy for the first UI object, wherein the immediate update policy indicates an immediate update to the UI to replace the first UI object with the second UI object responsive to receipt of the second UI object and the second data.

11. The computer-implemented method of claim 10, wherein the second UI object and the second data are received at the local data cache while the focus is maintained on the first UI object based at least in part on the next reload update policy of the first UI object, wherein applying the update further comprises reconstructing the UI from the local data cache based at least in part on the next reload update policy of the first UI object.

12. The computer-implemented method of claim 11, wherein the information source comprises at least one of a local database, application services associated with applications of the computing device, or a server computer in communication with the computing device, and wherein transmitting the request to the information source comprises querying the local database for the second UI object and the second data before querying the server computer for the second UI object and the second data.

13. A computing device comprising:

a processor; and a memory storing computer-readable instructions that, upon execution by the processor, configure the computing device to:

maintain information for one or more user interface (UI) objects, the information identifying, for an individual UI object of the one or more UI objects, an expiry policy, a UI-update policy, and a reference, the expiry policy associated with temporary storage upon a UI object replacement;

present a user interface (UI) that comprises the one or more UI objects;

determine that a trigger of a first expiry policy for a first UI object of the one or more UI objects has been triggered based at least in part on first data from the UI or the computing device;

determine to expire the first UI object from the UI based at least in part on the trigger of the first expiry policy for the first UI object;

generate a request for a second UI object of the one or more UI objects and second data for the second UI object based at least in part on the reference for the second UI object and the first expiry policy for the first UI object;

transmit the request to an information source;

receive, from the information source, at least the second UI object and the second data;

queue an update to the UI, the update queued based at least in part on the UI-update policy of the first UI object and on a focus established by a visual indicator moved on the first UI object by a navigation command;

apply the update to the UI by replacing the first UI object with the second UI object based at least in part on the second data, the update applied immediately in response to removal of the visual indicator from the first UI object, the removal corresponding to a navigation command that moves the visual indicator away from the first UI object;

determine, by the computing device and in response to replacing the first UI object with the second UI object at the UI, to maintain the first UI object after being replaced in a local data cache based at least in part on the first expiry policy for the first UI object; and update, by the computing device, the UI by replacing the second UI object with the first UI object retrieved from the local data cache using first data in response to a second indication of a second interaction with the second UI object, the second interaction corresponding to a second trigger for a second expiry policy of the second UI object.

14. The computing device of claim 13, wherein the memory stores additional computer-readable instructions that, upon execution by the processor, further configure the computing device to implement a renderer application for determining a hierarchy of the one or more UI objects based at least in part on the information.

15. The computing device of claim 14, wherein presenting the UI further comprises using the renderer application and the determined hierarchy of the one or more UI objects.

16. The computing device of claim 14, wherein the memory stores additional computer-readable instructions that, upon execution by the processor, further configure the computing device to implement a screen builder application for transmitting the request for the second UI object and the second data to the information source, and receiving the second UI object and the second data from the information source.

17. The computing device of claim 16, wherein the memory stores additional computer-readable instructions that, upon execution by the processor, further configure the computing device to:

generate, by the screen builder application, a data pipeline for transmitting bytes that correspond to the second UI object and the second data from the information source;

write, by the screen builder application, the bytes to the data pipeline; and read, by the renderer application, the bytes from the data pipeline for the second UI object and the second data, wherein updating the UI by replacing the first UI object with the second UI object further comprises using the renderer application and the bytes.

18. The computing device of claim 13, wherein the memory stores additional computer-readable instructions that, upon execution by the processor, further configure the computing device to:

receive, by the computing device and from the information source, a query generated by the information source to modify a response to the request for the second UI object, wherein the request includes a data object filter and the response is modified to remove a portion of the second data from the response in response to at least the portion of the second data being identified by the data object filter as being stored in the local data cache.

19. The computing device of claim 13, wherein the memory stores additional computer-readable instructions that, upon execution by the processor, further configure the computing device to obtain user profile information for a user associated with the computing device, the user profile information identifying at least content consumed during a certain time period.

20. The computing device of claim 19, wherein the memory stores additional computer-readable instructions that, upon execution by the processor, further configure the computing device to:

generate another request for certain UI objects and third data for the certain UI objects using the user profile information, the certain UI objects corresponding to certain content associated with the content;

transmit the another request to the information source; and store the certain UI objects and the third data in a local data cache in response to receiving a response from the information source.

* * * * *